(12) United States Patent  
Garvey et al.

(10) Patent No.: US 9,314,867 B2
(45) Date of Patent: Apr. 19, 2016

(54) REPLACEABLE MACHINE-MOUNTED MALE INPUT POWER CONNECTIONS

(71) Applicants: Paul William Garvey, Freedom, WI (US); Scott S. Liebert, Freedom, WI (US)

(72) Inventors: Paul William Garvey, Freedom, WI (US); Scott S. Liebert, Freedom, WI (US)

(73) Assignee: Illinois Tool Works Inc., Glenview, IL (US)

(*) Notice: Subject to any disclaimer, the term of this patent is extended or adjusted under 35 U.S.C. 154(b) by 356 days.

(21) Appl. No.: 13/793,391

(22) Filed: Mar. 11, 2013

(65) Prior Publication Data

US 2014/0251972 A1 Sep. 11, 2014

(51) Int. Cl.
| | |
|---|---|
| *B23K 9/10* | (2006.01) |
| *H01R 13/62* | (2006.01) |
| *B23K 9/12* | (2006.01) |
| *B23K 9/32* | (2006.01) |
| *H01R 4/00* | (2006.01) |
| *H01R 4/56* | (2006.01) |
| *H01R 101/00* | (2006.01) |

(52) U.S. Cl.
CPC ............. *B23K 9/123* (2013.01); *B23K 9/1006* (2013.01); *B23K 9/32* (2013.01); *H01R 4/54* (2013.01); *H01R 4/56* (2013.01); *H01R 2101/00* (2013.01); *Y10T 29/49826* (2015.01)

(58) Field of Classification Search
CPC ............ B23K 9/10; B23K 9/32; B23K 9/123; H01R 31/06; H01R 4/28; H01R 13/62; H01R 43/26
USPC ..................................................... 219/137.61
See application file for complete search history.

(56) References Cited

U.S. PATENT DOCUMENTS

| | | | |
|---|---|---|---|
| 5,902,150 A * | 5/1999 | Sigl et al. ....................... 439/587 |
| 6,193,548 B1 | 2/2001 | Sigl et al. |
| 2005/0014410 A1* | 1/2005 | Justice ............................. 439/320 |
| 2007/0284352 A1* | 12/2007 | Lynaugh et al. ............ 219/137.2 |

* cited by examiner

*Primary Examiner* — Brian Jennison
(74) *Attorney, Agent, or Firm* — Quarles & Brady, LLP

(57) ABSTRACT

A system and method for replaceable machine-mounted male input power connections includes a power connection unit that is at least partially arranged within a housing and configured to transfer power received from a power source to drive a welding process. The power connection unit includes an input configured to receive power from the power source, an output configured to deliver the power received at the input to drive the welding process, and a bus system, configured to connect the input and the output. The power connection unit also includes a male connector having a conductive post extending to a threaded cylindrical shaft. The male conductor forms at least a portion of the input or the output and extends from the housing through a coupling assembly. The coupling assembly includes a correspondingly threaded portion configured to engage the threaded cylindrical shaft of the male connector to the bus system.

14 Claims, 6 Drawing Sheets

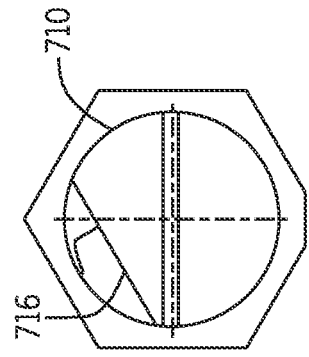
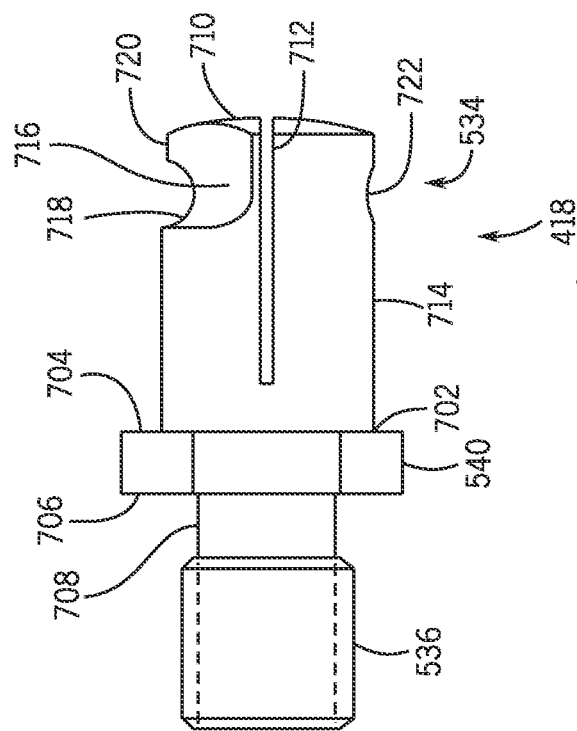
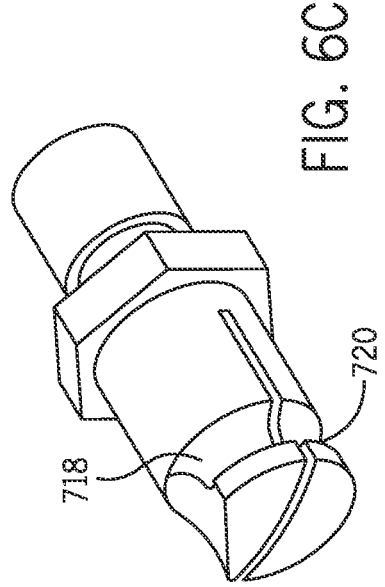

REPLACEABLE MACHINE-MOUNTED MALE INPUT POWER CONNECTIONS

CROSS-REFERENCE TO RELATED APPLICATIONS

N/A

STATEMENT REGARDING FEDERALLY SPONSORED RESEARCH

N/A

BACKGROUND OF THE INVENTION

The field of the invention is welding systems. More particularly, the invention relates to power input connections of an electric welding system.

Welding is the process of joining two or more metal parts by bringing metals into a molten state in which they flow together to create a welded joint. The process commonly employs a consumable electrode in the form of a welding wire that passes through a wire feeder to a welding gun. The wire feeder is often portable and designed for field use. During operation, the wire feeder receives a welding current from a remote power source and passes the current to other welding equipment through cables to form a complete electrical circuit.

Traditionally, the electrical connectors of the wire feeder utilize ring terminals to connect to fixed studs or the like. These connectors, though designed to have the ring terminals and studs be connected and disconnected, generally, require tools to do so. Furthermore, these connectors are often designed to extend through a housing and/or sealed electronics enclosure. Such housings or sealed enclosures are typically designed to prevent water and dust from entering the electrical components to which the connectors are affixed through a hard-wired connection, particularly during field deployment. Unfortunately, if such a connector is substantially damaged, the housing and/or enclosure must be disassembled and the hard-wired connection disconnected and replaced to affix a new connector.

Recognizing that such connections can be cumbersome to utilize because they often require the use of wrenches, nuts, and the like, in some instances, a short piece of weld cable has been configured with so-called "quick-connect" terminal as male connector ends. Such cable arrangements protrude from either end of the wire feeder in a "pigtails" fashion and are either connected to a terminal or stud that is permanently affixed to the internal electrical components or directly connected to the internal electrical components through a hard-wired connection. Though a hard-wired or cumbersome connection affixes the pigtail to the wire feeder, the quick-connect terminal dangling at the end of the pigtail advantageously provides an efficient connection mechanism on the opposing end of the pigtail.

Although the pigtails provide the advantage of a "quick-connect" terminal for making electrical connections, they may be problematic in other aspects. For instance, while one end of the pigtail is fitted with a quick-connect terminal, the pigtail is, generally, fixedly connected to the wire feeder, either through a hardwiring that also extends through the electronics enclosure or through connections that require tools such as wrenches, nuts, and the like, to control. In such configurations, the above-described drawbacks of cumbersome connections and hard-wired connections extending through the wire feeder enclosure persist. Also, the pigtails add unwanted weight and bulk to the wire feeder, thereby limiting its mobility. Further, the pigtails command extra attention and management, since the quick-connector terminal at the ends of the pigtail may be susceptible to damage during use and transportation. Furthermore, in the event the quick-connector terminal becomes worn or damaged, a user must replace it by either cutting the cable of the pigtail and soldering a new quick-connector terminal at the end of the pigtail, or replacing the entire pigtail. The lengthy repair process becomes costly and often troublesome, especially if a repair must be performed in the field.

Therefore, it would be desirable to have a system and method to facilitate connection and repair of welding cables with welding systems that is not hampered by the shortcomings of traditional connection systems.

SUMMARY OF THE INVENTION

The present invention overcomes the aforementioned drawbacks and offers related advantages by providing a system and method for directly mounting male quick-connector terminals onto a wire feeder. Specifically, the present invention includes a system and method for threadably engaging a male quick-connector terminal into a coupling assembly that is mounted directly onto the wire feeder.

In accordance with one aspect of the invention, a wire feeder for a welding system is disclosed that includes a wire supply source configured to deliver a consumable wire electrode to a welding torch during a welding process, a housing extending about at least a portion of the wire feeder, and a power connection unit at least partially arranged within the housing and configured to transfer power received from a power source during the welding process. The power connection unit includes an input configured to receive power from the power source, an output configured to deliver the power received at the input to drive the welding process and a bus system, configured to connect the input and the output. A male connector is included having a conductive post extending to a threaded cylindrical shaft. The male conductor forms at least a portion of at least one of the input and the output and extends from the housing through a coupling assembly. The coupling assembly includes a correspondingly threaded portion configured to engage the threaded cylindrical shaft of the male connector to the bus system.

In accordance with another aspect of the invention, a welding system, is disclosed that includes a welding torch, a power source configured to deliver power to the welding torch to perform a welding process, and a wire delivery system configured to deliver a consumable wire electrode to the welding torch during the welding process. The wire delivery system includes a wire supply unit configured to deliver a consumable wire electrode to a welding torch during a welding process, a housing extending about at least a portion of the wire feeder, and a power connection unit at least partially arranged within the housing and configured to transfer power received from the power source during the welding process. The power connection unit includes an input configured to receive power from the power source, an output configured to deliver the power received at the input to drive the welding process, a bus system, configured to connect the input and the output, and a male connector having a conductive post extending to a threaded cylindrical shaft. The male conductor forms at least a portion of at least one of the input and the output and extends from the housing through a coupling assembly. The coupling assembly includes a correspondingly threaded portion configured to engage the threaded cylindrical shaft of the male connector to the bus system.

In accordance with yet another aspect of the invention, a method for mounting a male connector to a power bus of a wire feeder, the method is disclosed that includes providing a bridging connector inserted through at least one sealed bulkhead, inserting a first cylindrical portion of the male connector into a first end of the bridging connector, and exposing a second cylindrical portion of the male connector extending from the first portion, wherein the second cylindrical portion is configured to engage a receiving connector. The method also includes connecting the power bus to a second end of the bridging connector, wherein the power bus is configured to transfer power within the wire feeder and providing a conduit within the bridging connector for electrical current flow between the male connector and the power bus.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 6A is a side view of the male connector in accordance with one embodiment of the present invention;

FIG. 6B is a front view of the male connector in accordance with one embodiment of the present invention; and FIG. 6C is an angled perspective view of the male connector in accordance with one embodiment of the present invention.

DETAILED DESCRIPTION OF THE INVENTION

Figure 1:
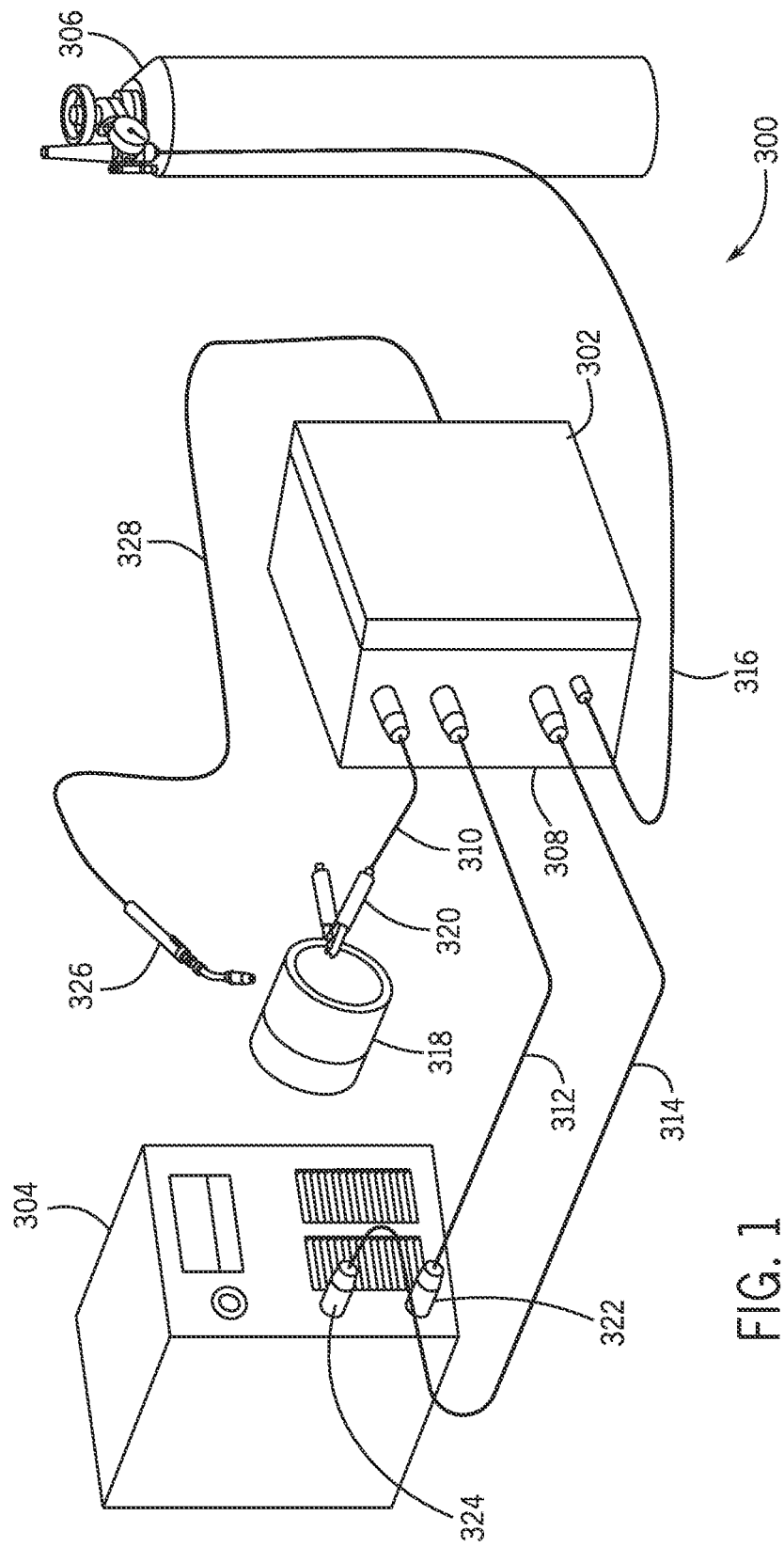
FIG. 1 is a perspective view of an electric welding system having a wire feeder in accordance with the present invention.

The present invention includes a system and method for providing one or more male connections, such as quick-connector terminals directly onto a panel mounting, such as integrating the quick connector terminals into the wire supply source, which is hereon referred to as a wire feeder. Referring to FIG. 1, a general setup of an electric welding system 300 comprises a wire feeder 302 connected to a remote power source 304 and a gas source 306. The wire feeder 302 shown is portable and designed to utilize a weld current supplied from the remote power source 304, which is capable of supplying the electrical weld current for welding. The wire feeder 302 includes a power connections side panel 308 having four connectors that are connected to a work cable 310, a first weld cable 312, a second weld cable 314, and a gas cable 316.

Specifically, the work cable 310 comprises one end having a male connector received in a female connector on the power connections side panel 308, and a second end having a clamp 320 attached to a work piece 318. The first and second weld cables 312, 314 connect the wire feeder 302 to the first and second terminals 322, 324 on the power source 304, respectively. In particular, each weld cable 312, 314 comprises a male connector at a first end that receives a female connector on the power source 304, and a female connector at a second end that receives the male connector mounted directly onto the power connections side panel 308 of the wire feeder 302. The gas cable 316 provides a conduit for a shielding gas released from the gas source 306 during welding. A torch gun 326 attaches to an electrode cable 328 that is provided on a second side (not shown) of the wire feeder 302. Note that although two male connectors are discussed, the present embodiment may be implemented using one or any plurality of direct-mounted male connectors.

During execution of a welding process with the electric welding system 300 shown in FIG. 1, the power source 304 provides power input through the weld cables 312, 314 while the gas source 306 delivers a shielding gas through the gas cable 316. The power input is properly apportioned by the wire feeder 302 for delivery to the work piece 318 and the torch 326, and an electrical arc is created for welding. It is worthy to note that various components shown in FIG. 1 may be rearranged or substituted without compromising embodiments of the present disclosure, as understood by one skilled in the art. For instance, and merely by way of example, the gas cylinder 306 may be replaced with a travel sized gas cylinder disposed within the wire feeder 302, the clamp 320 may represent any other attachment means. Likewise, the present invention may be utilized with other welding systems, such as including non-portable wire feeder systems or other welding systems, such as tungsten inert gas (TIG) or stick welding systems, or other welding or plasma cutting systems. As such, gas connections and gas sources, such as described above, may not be included, depending upon application.

Figure 2:
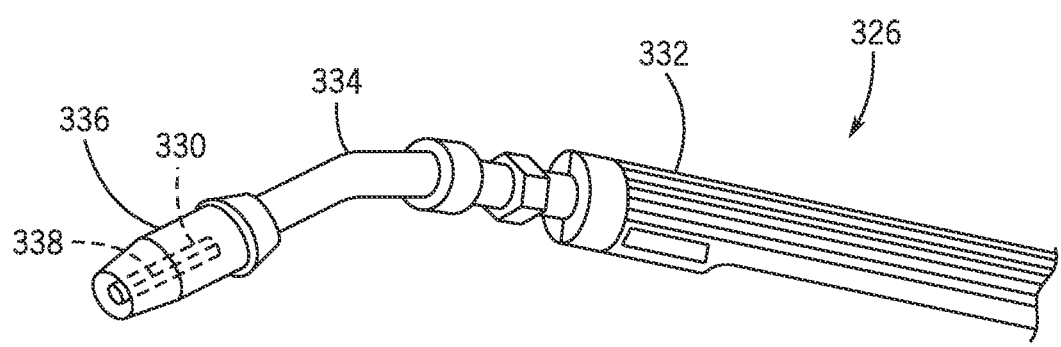
FIG. 2 is a perspective view of a wire-feed welding gun for use with the welding system illustrated in FIG. 1.

Referring now to FIG. 2, the torch 326 and tip 330 are shown in detail. The torch 326 is a conventional welding torch that is used to initiate and a maintain welding process. The torch 326 includes a torch body 332 through which the consumable wire 338 is fed from the wire feeder 302 as described above. At the end of the torch body 332, a barrel 334 is formed that is connected to a welding nozzle 336 including the contact tip 330.

Referring to FIGS. 1 and 2, the tip or contact tip 330 of the torch 326 forms an axial bore that provides a sliding electrical contact through which power delivered from the above-described remote power source 304 is transferred to the wire 338 to form an energized electrode extending from the gun 326 to effectuate the welding process. In operation, when the tip 330 of the gun 326 is positioned proximate to a work piece 318, the welding wire 338 comes into contact with the work piece 318 and an electrical current passes through the welding wire 338 to the work piece 318 causing the welding wire 338 to be heated and melt. As a result, an electrical arc is established that causes the welding wire 338 to continue to melt and initiates a transfer of melted welding wire to the work piece 318 where the welding wire 338 fuses with the work piece 318. Because the electrical energy supplied by the remote power source 304 is typically greater than that required to melt the welding wire 338, most of the remaining energy heats the tip 330 and work piece 318. As a result, the area on the work piece 318 surrounding the weld also melts, which yields an improved bonding between the melted welding wire and the work piece 318.

Figure 3:
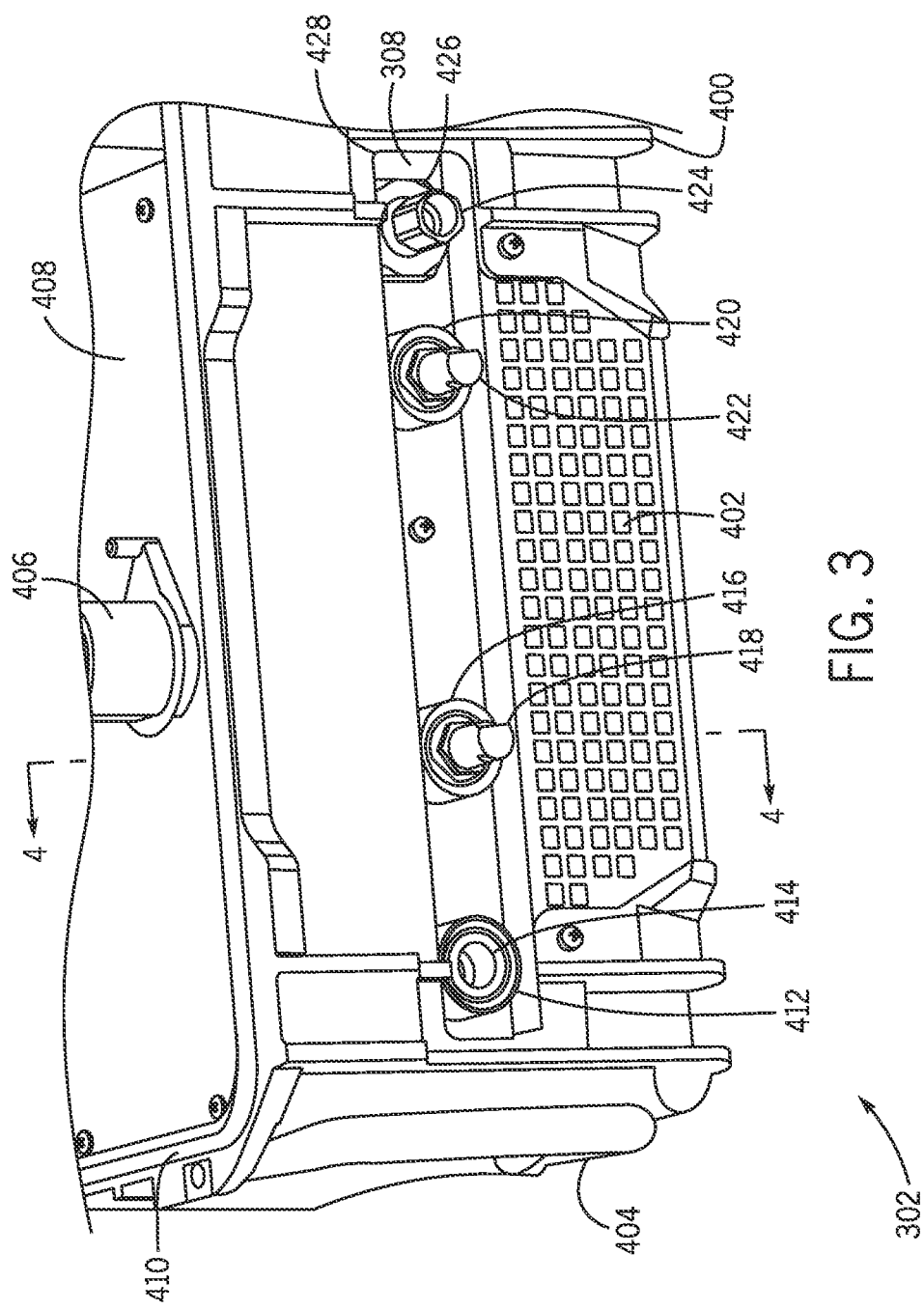
FIG. 3 is a perspective view of male connectors mounted on a wire feeder in accordance with one embodiment of the present invention.

Turning now to FIG. 3, a close up on a portion of the wire feeder 302 shows the power connections side panel 308 disposed above a vent strip 402 that is attached to an external housing 400 of the wire feeder 302. The external housing 400 protects interior components and further provides a handle 404 for aiding maneuverability. Both of the housing 400 and the handle 404 may be composed of lightweight, durable materials capable of withstanding shocks and weathering while maintaining the overall portability of the wire feeder 302. Such materials might include durable plastics, polycarbonate, carbon or aluminum alloys for the handle, and the like, and may be rugged in design. The housing may further provide labels indicative of the cable connections at the power connections side panel 308. As shown further in FIG. 3, a cover (not shown) of the housing 400 may be lifted or detached to expose components within the housing 400, such as a spool 406 for receiving a reel of the consumable electrode wire (not shown) that is fed to the torch gun 326 during welding. In one embodiment, the spool 406 may be mounted on a platform 408 or other component within or outside the housing 400. Unless otherwise noted, various attachment means for the components described herein may comprise permanent attachment means, manufactured as a single piece, adhesive, and the like, or detachable means, such as screws, snap action, friction fitting, and the like. Furthermore, the housing 400 may provide a sealing edge 410 configured to be disposed against the liftable or detachable cover (not shown) to prevent unwanted exposure of the interior to weather, insects, water, debris and the like. The sealing edge 410 might comprise rubber, foam, or other deformable materials having desirable characteristics for sealing applications.

Still referring to FIG. 3, the power connections side panel 308 comprises four connectors configured to receive the four cables 310, 312, 314, 316 as described above. A work connector 412 comprising a female connector 414 is configured to receive the male connector end of the work cable 310. The female connector 414 may comprise any electrically conductive metallic hardware having a recessed hole that is constructed to receive an extending element of the male connector. Two power input connectors 416, 420 are provided for receiving the weld current from the remote power source 304. Each power input connectors 416, 420 comprises a male connector 418, 422, respectively, configured to receive the female connector end of a first or second weld cable 312, 314, respectively. The male connectors 418, 422 may comprise any electrically conductive metallic hardware having an extending conductive element that is configured to be received in a female connector. Notably, the male connectors 418, 422 as shown in the present embodiments are mounted directly onto the wire feeder 302. To the extent that industry standards exist for ascribing a gender for various connectors based on their power input or output functions, the present embodiment conforms by assigning the female connector 414 to the connector of cable 310 that outputs power, and the male connectors 418, 422 to the power input connectors 416, 420. Furthermore, it is noted that any input or output functionality of the male or female connectors as shown shall not limit the scope of the present embodiments.

The gas connector 424 may comprise a gas valve 426 protruding from the power connections side panel 308 that is configured to receive the gas cable 316 as described above. In one embodiment, the gas valve 426 threadably engages a threaded outlet end of the gas cable 316, although various other connection means may apply. Importantly, the gas connector 424 provides an orifice (not shown) aligned with a flow pathway of the gas cable 316 to convey the gas to the inside of the wire feeder 302, as required during the welding process.

Any or all of the four connectors 412, 416, 418, 424 may be mounted directly to a portion of the external housing 400 or to an interior housing, such as an electronics enclosure (see FIG. 4), that is disposed within the external housing 400. In the latter case, which is shown in FIG. 3, the four connectors 412, 416, 418, 424 may be aligned with a slot 428 on the housing 400 that exposes a portion of the interior housing in which the connectors 412, 416, 418, 424 are mounted. More particularly, the slot 428 may be provided on the power connections side panel 308 of the housing 400. In either case, it is noted that the power connections side panel 308 refers to a portion of the wire feeder 302 in which the connectors 412, 416, 418, 424 are collectively displayed. Further, it is noted that the connectors 412, 416, 418, 424 may be placed in any order, and may represent one or any plurality of connectors.

Figure 4:
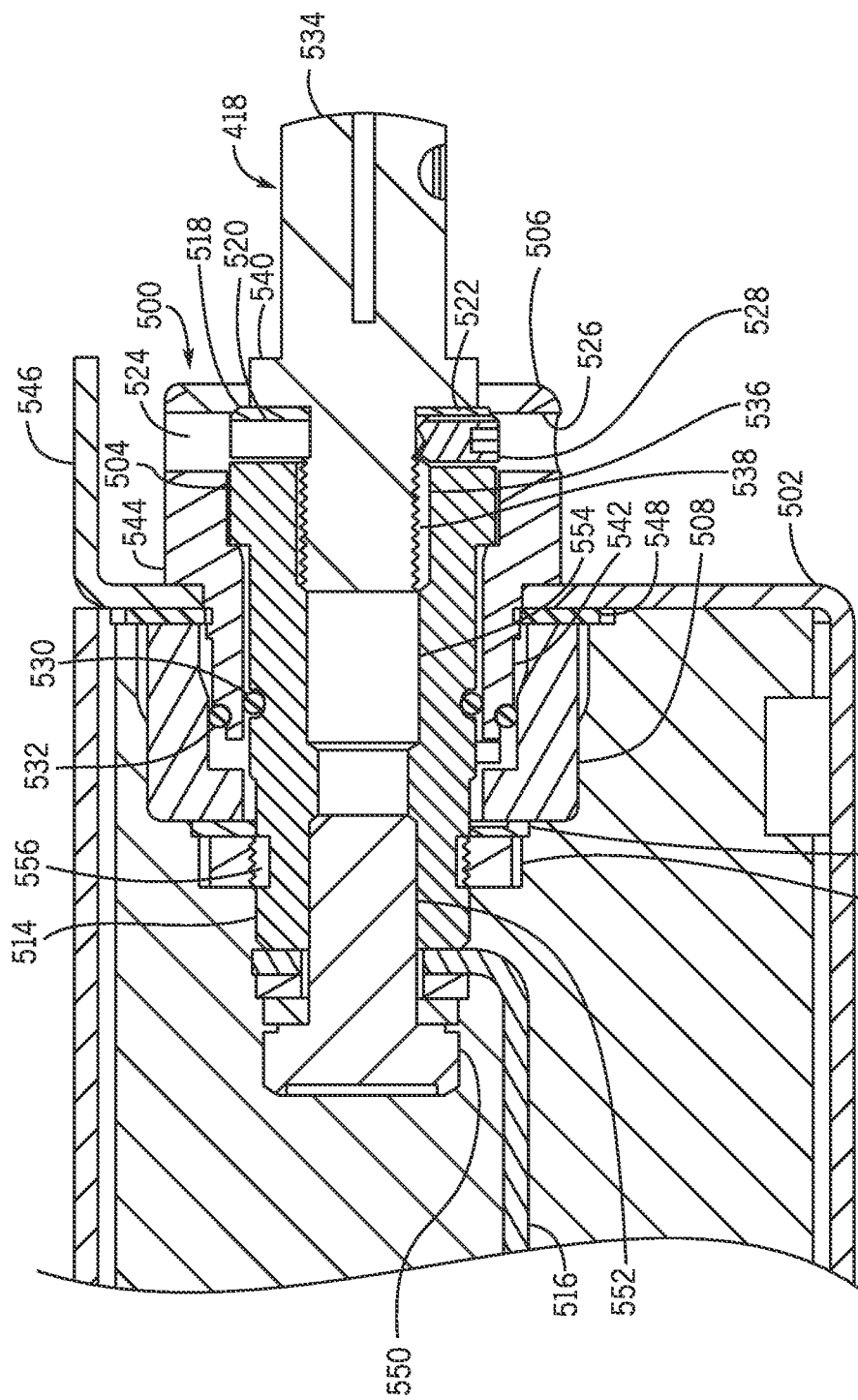
FIG. 4 is a cross-sectional view taken along line 4-4 of FIG. 3.

Referring to FIG. 4, a cross section taken along lines 4-4 of FIG. 3 shows the male connector 418 mounted directly onto an electronics housing 502 located within the wire feeder 302. Specifically, the male connector 418 extends outwardly from the electronics housing 502 by securing to a coupling assembly 500, which comprises a bridging connector 504 received within a first bulkhead 506 that is further received within a second bulkhead 508. The second bulkhead 508 abuts a washer 510 and nut 512 arrangement that is secured proximate to an inside end 514 of the bridging connector 504, whereby said inside end 514 is further attached to a power bus bar 516. Opposing said inside end 514 on the bridging connector 504 is an outside end 518 having an upper and lower set screw orifice 520, 522, each orifice configured to align with a respective upper and lower set screw passage 524, 526 provided on the first bulkhead 506. One or both of corresponding pairs of set screw orifices 520, 522 and passages 524, 526 may be configured to receive a set screw 528, which impinges on a portion of the male connector 418 to prevent loosening of the connector 418 during thermal cycles and repeated connections and disconnections with the female connectors of the weld cables 312, 314. Further, the coupling assembly 500 may be sealed from fluid or air by engaging a first o-ring 530 held between the bridging connector 504 and the first bulkhead 506, and a second o-ring 532 held between the first bulkhead 506 and the second bulkhead 508.

In one embodiment, the male connector 418 comprises a protruding element 534 extending to a threaded cylindrical shaft 536 that engages corresponding threads 538 proximate the outside end 518 of the bridging connector 504. As seen in FIG. 4, the threaded engagement may be adjacent to the set screw orifices 520, 522. Together, the threaded engagement and the set screw 528 secure the male connector 418 onto the bridging connector 504. In some embodiments, the male connector 418 further comprises a radial skirt 540 juxtaposed flush against the outside end 518 of the of the bridging connector 504. The radial skirt 540 may aid in positioning the male connector 418 onto the coupling assembly 500. As described previously, the male connector 418 is constructed from an electrically conductive material, and may be designed in any variety of male threading, such as TWECO® connectors, DINSE® connectors, quick-release mechanisms, and other standard or non-standard male connectors known in the art. The present embodiment utilizes a male connector having quick-release locking mechanism on the cylindrical protruding element 534, as described in further detail in FIGS. 6A-6C.

Still referring to FIG. 4, the coupling assembly 500 is adapted to retain a portion of a wall of the electronics housing 502 between two opposing surfaces of the first bulkhead 506 and the second bulkhead 508. In particular, the first bulkhead 506 includes an inner bulkhead segment 542 of lesser radial diameter extending to an outer bulkhead segment 544 of greater radial diameter. The inner bulkhead segment 542 is inserted within the second bulkhead 508. The outer bulkhead segment 544 abuts an outer surface of the electronics housing 502 underneath a housing protrusion 546. The second bulkhead 508 and the outer bulkhead segment 544 define the two opposing surfaces that cooperatively compress and secure the wall of the housing 502. The compressive force may be provided, at least in part, by the washer 510 and nut 512 threadably engaged onto the inside end 514 of the bridging connector 504 at surface threads 556. The nut 512 fixes the washer 510 flush against the second bulkhead 508 and pushes the second bulkhead 508 against the housing 502, while drawing inward the bridging connector 504 and the first bulkhead 506. In some embodiments, a gasket 548 is provided between the second bulkhead 508 and the housing 502 so that fluid and dust are prevented from entering the housing 502. Furthermore, it is noted that the above components of the coupling assembly 500 may comprise additional fitting or securing means, such as snap fitting, frictional fitting, deformation, lock and key mechanisms, etc., to engage the components together into assembly.

FIG. 4 further shows the function of the bridging connector 504 which facilitates the electrical connection between the male connector 418 and the power bus bar 516. The power bus bar 516 may be coupled at the inside end 514 of the bridging connector 504. In some embodiments, a threaded bolt 550 may fasten the bus bar 516 to the connector 504 having corresponding bridging threads 552 at the inside end 514. The bridging connector 504 is configured to join the coupling assembly 500 through the threaded bolt 550 to the bus bar 516. In another aspect, different male connectors 418 may vary in the diameters of the threaded cylindrical shaft 536, such that a different bridging connector 504 may be configured to fit each type of male connector 418. Ultimately, the bridging connector 504 provides an electrical channel 554 between the male connector 418 and the bus bar 516 so that an electrical connection can be established and transferred to other components of the wire feeder 302.

Figure 5:
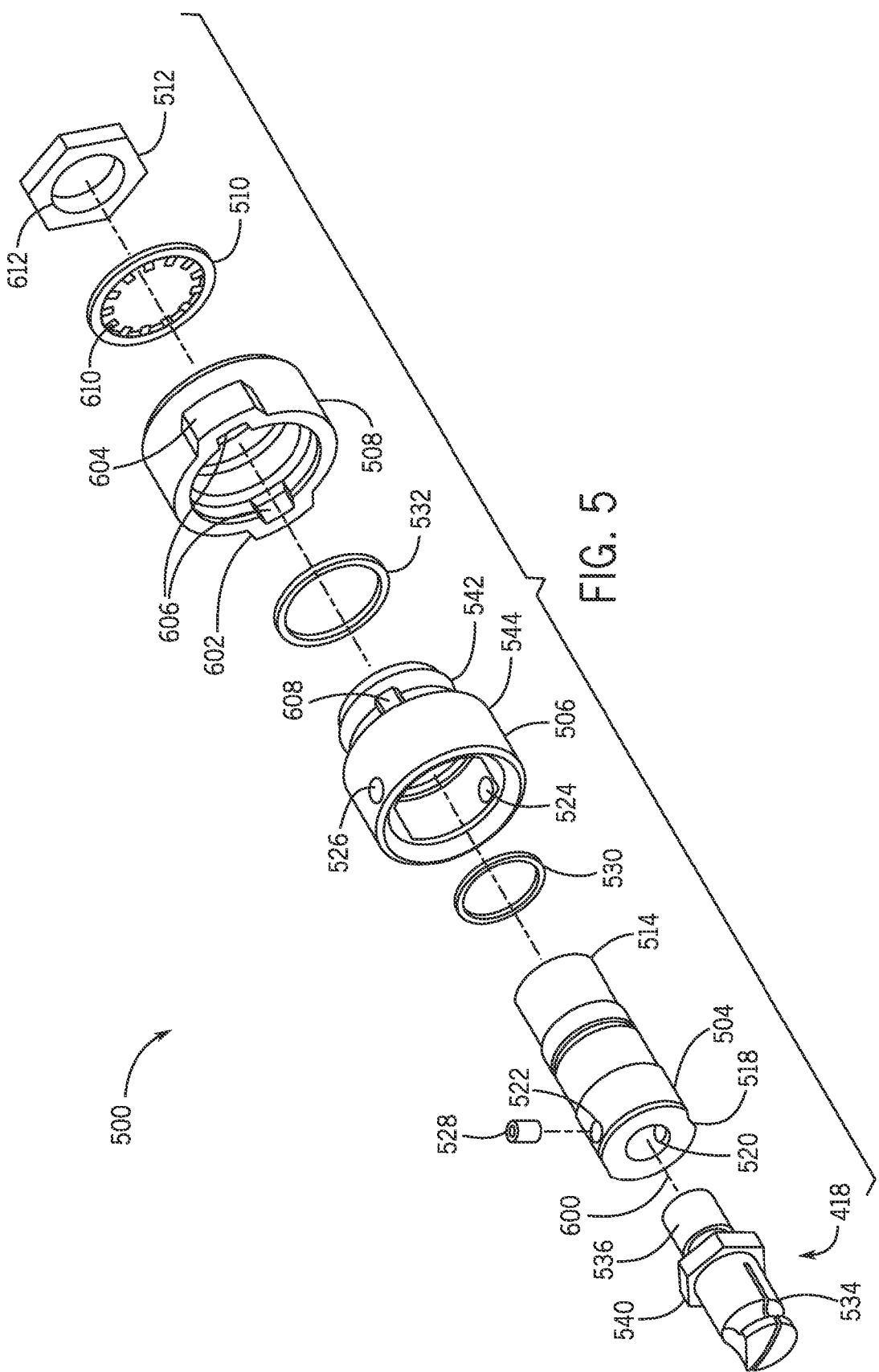
FIG. 5 is a an exploded view of a male connector and coupling assembly in accordance with the present invention.

Turning now to FIG. 5, an exploded view along an imaginary coaxial line 600 of the male connector 418 and the coupling assembly 500 is shown. The male connector 418 comprises a protruding element 534 having a radial skirt 540 and extending to a threaded cylindrical shaft 536. The shaft 536 is received through the outside end 518 of the bridging connector 504 and threadably engaged to the interior corresponding threads 538 (see FIG. 4) of the connector 504. The connector 504 further provides the upper and lower set screw orifices 520, 522, one or more of which is configured to receive the set screw 528 that locks the male connector 418 into place. The inside end 514 of the bridging connector 504 is inserted through the first o-ring 530 and subsequently through the first bulkhead 506. As shown in FIG. 4, the upper and lower set screw passages 524, 526 provided on the outer bulkhead segment 544 are configured to align with the upper and lower set screw orifices 520, 522 of the bridging connector 504. Note that although two set screw assemblies are shown, one or any plurality of set screw assemblies may be provided in the present embodiment.

Extending behind the outer bulkhead segment 544 is the inner bulkhead segment 542 that receives the second o-ring 532 and is subsequently contained entirely within the second bulkhead 508. Accordingly, an inner surface of the second bulkhead 508 comprises a larger diameter than the outer diameter of the inner bulkhead segment 542, and in some cases, said inner diameter of the second bulkhead 508 is also larger than the outer diameter of the outer bulkhead segment 544, as illustrated in FIG. 4. The second bulkhead 508 may provide two opposing flanges 602, 604 that are each indented with a notch 606 on an inner surface. Each notch 606 may be configured to receive a corresponding projection 608 on the first bulkhead 506 to aid in proper positioning and securing. It is noted that any number of flanges and/or notches, or lack thereof, may be utilized in the present embodiment. Finally, the washer 510 and nut 512 assembly may be positioned behind the second bulkhead 508 and received on a portion of the bridging connector 504 proximal to its inside end 514. In one particular embodiment, the washer 510 includes a plurality of internal teeth 610 that may prevent the preceding components and/or the nut 512 from backing out. The nut 512 may comprise a hexagonal nut having a threaded interior 612 for engaging the surface threads 556 provided on the bridging connector 504 (see FIG. 4). As shown in FIG. 5, the components of the coupling assembly 500 are intended to be coaxially aligned and fitted together with the male connector 418.

FIGS. 6A-6C illustrate one example of the male connector 418, which includes the cylindrical protruding element 534, or a first cylindrical portion, extending to the radial skirt 540 and further extending to the threaded cylindrical shaft 536, or a second cylindrical portion. In reference to FIG. 6A, the radial skirt 540 may be a hexagonally shaped skirt joined to a base end 702 of the protruding element 534 on an outer side 704 and a stem 708 on an inner side 706 of the skirt 540. The inner side 706 may comprise a substantially flat surface that is configured to abut a corresponding surface of the bridging connector 504, as described above. The stem 708 may extend to the threaded cylindrical shaft 536. Any threading pattern may be utilized, such as a 1/2-13 UNC-2A, with the corresponding threads 538 of the bridging connector 504 fashioned in corresponding manner. Merely by way of example, the length of the threaded shaft 536 may be approximately 0.520-0.530 in., the threaded shaft 536 including the whole stem 708 may be 0.683-0.693 in., and the threaded shaft 536 including the stem 708 and the whole radial skirt 540 may be 0.871-0.881 in. The length of the protruding element 534 may be approximately 0.925 in. long, such that it is slightly longer than the combined threaded shaft 536, stem 708, and radial skirt 540. In the present embodiment, the male connector 418 is approximately 1.801 in. long. The diameter of the protruding element 534 may be approximately 0.624 in., whereas the diameter of the stem 708 may be smaller around 0.395-0.405 in. Further, the male connector 418 described above may be manufactured from a single piece of conductive metal, such as brass. Of course, these dimensions and configurations are for exemplary purposes only and are non-limiting.

The protruding element 534 shown in FIG. 6A may be designed to have any variety of male threading, such as TWECO® connectors, DINSE® connectors, the Lenco Standard LC-40 Male connector, or other such connectors. In the preferred embodiment, the threading is quick-release designed which allows for fast engagement and disengagement with a female connector. In the quick-release design shown, the protruding element 534 may include an arcuate face 710 having a generally circular surface area and curved downward on a conductive post 714. The arcuate face 710 is halved into two generally semicircular shapes by a radial trough 712 that extends across a centerpoint of the face 710 and longitudinally down through the conductive post 714 toward the base end 702. A longitudinal groove 716 is chipped from an outer surface of the conductive post 714 on an end near the arcuate face 710. As shown in FIG. 6B, the generally circular perimeter of the arcuate face 710 is interrupted by the longitudinal groove 716 that cuts into one semicircular portion of the arcuate face 710.

As shown in FIG. 6A-6C, immediately behind the arcuate face 710 is an annular channel 718 extending from one side of the longitudinal groove 716. The channel 718 is carved into the conductive post 714 such that an annular ridge 720 is defined. The annular ridge 720 and the channel 718 span approximately a half ring around and behind the arcuate face 710, whereby a first end of the half ringlike channel 718 is deepest near the longitudinal groove 716. The channel 718 gradually becomes shallow as the second end of the half ringlike channel is approached at a ridge end 722 (see FIG. 6A) approximately opposite the first end. The embodiment described herein provides a cam action mechanism for engaging to the female connector that generally comprises a hollow cylindrical tube having a wedge protruding from an interior surface of the tube. To engage the female connector with the male connector 418 described above, the wedge is initially aligned with the groove 716 and then rotated so that the wedge is received in the annular channel 718 behind the annular ridge 720. Continued rotation in the same direction causes the wedge to travel along the channel 718 toward the ridge end 722. The radial trough 712 provides a linear spring action that contributes to a secure fit of the conductive post 714 within the female connector. The secure fit reduces electrical resistance and improves performance of the connection. To disengage, the wedge is simply rotated back in line with the groove 716 and released. It is contemplated that rotation of the wedge, and therefore of the female connector, comprises approximately a half turn, and up to approximately a full turn, for engaging or disengaging from the male connector 418.

Therefore, the above-described system and method permits directly mounting male connectors onto a wire feeder. Specifically, the present invention includes a system and method for threadably engaging a male connector into a coupling assembly that is mounted directly onto the wire feeder. The advantages of the present embodiments are numerous. In one aspect, the machine-mounted male connectors minimize the overall size and bulk of the wire feeder to provide a less complex and more portable feeder. Direct mounting of the male connectors also substantially reduces the weight of wire feeder. The design further allows for easy replacement of the male connectors in the event they are worn, dirty or damaged. For instance, a worn male connector need only be unlocked by the set screw and unthreaded from the coupling assembly prior to threading in and locking a new male connector. The improved serviceability reduces downtime of the wire feeder. Direct mounting also reduces the damage susceptibility of the male connectors, which promotes improved performance.

The present invention has been described in terms of one or more preferred embodiments, and it should be appreciated that many equivalents, alternatives, variations, and modifications, aside from those expressly stated, are possible and within the scope of the invention.

We claim:

1. A wire feeder for a welding system, comprising:
   a wire supply source configured to deliver a consumable wire electrode to a welding torch during a welding process;
   a housing extending about at least a portion of the wire feeder;
   a power connection unit at least partially arranged within the housing and configured to transfer power received from a power source during the welding process, the power connection unit comprising:
      an input configured to receive power from the power source;
      an output configured to deliver the power received at the input to drive the welding process;
      a bus system, configured to connect the input and the output; and
      a male connector having a conductive post extending to a threaded cylindrical shaft, the male conductor forming at least a portion of at least one of the input and the output and extending from the housing through a coupling assembly, wherein the coupling assembly comprises a correspondingly threaded portion configured to engage the threaded cylindrical shaft of the male connector to the bus system.

2. The wire feeder of claim 1, wherein the conductive post comprises a cam action mechanism for engaging a receiving connector.

3. The wire feeder of claim 1, further comprising a set screw configured to further secure the male connector to the coupling assembly.

4. The wire feeder of claim 1, wherein the coupling assembly further comprises at least one bulk head.

5. The wire feeder of claim 1, wherein the coupling assembly further comprises at least one o-ring.

6. The wire feeder of claim 1, wherein the coupling assembly further comprises at least one washer and nut assembly.

7. The wire feeder of claim 1, further comprising an electronics housing disposed within the housing and surrounding the bus system and wherein the coupling assembly is configured to receive and secure at least one of the housing and a portion of the electronics housing.

8. The wire feeder of claim 1, wherein a portion of the coupling assembly extends through the housing.

9. The wire feeder of claim 1, wherein the bus system includes a bus bar configured to complete an electrical connection between the input and the output and wherein the coupling assembly is attached to the bus bar disposed within the housing.

10. The wire feeder of claim 1, wherein the coupling assembly further comprises a gasket configured to seal the coupling assembly.

11. The wire feeder of claim 1, wherein the housing is constructed from plastic and comprises at least one handle.

12. A welding system, comprising:
   a welding torch;
   a power source configured to deliver power to the welding torch to perform a welding process; and
   a wire delivery system configured to deliver a consumable wire electrode to the welding torch during the welding process, the wire delivery system comprising:
      a wire supply unit configured to deliver a consumable wire electrode to a welding torch during a welding process;
      a housing extending about at least a portion of the wire feeder;
      a power connection unit at least partially arranged within the housing and configured to transfer power received from the power source during the welding process, the power connection unit comprising:
         an input configured to receive power from the power source;
         an output configured to deliver the power received at the input to drive the welding process;
         a bus system, configured to connect the input and the output; and
         a male connector having a conductive post extending to a threaded cylindrical shaft, the male conductor forming at least a portion of at least one of the input and the output and extending from the housing through a coupling assembly, wherein the coupling assembly comprises a correspondingly threaded portion configured to engage the threaded cylindrical shaft of the male connector to the bus system.

13. The wire delivery system of claim 12, further comprising an electronics housing arranged within the housing and enclosing the bus system and wherein the coupling assembly is further mounted onto the electronics housing and extends through the electronics housing and the housing.

14. The wire delivery system of claim 13, wherein at least a portion of the male connector extends through the housing of the wire delivery system.

\* \* \* \* \*